(12) United States Patent
Matsueda et al.

(10) Patent No.: US 8,097,556 B2
(45) Date of Patent: Jan. 17, 2012

(54) EXHAUST GAS-PURIFYING CATALYST AND METHOD OF MANUFACTURING THE SAME

(75) Inventors: Satoshi Matsueda, Kakegawa (JP); Mareo Kimura, Kakegawa (JP); Hirohisa Tanaka, Ikeda (JP); Mari Uenishi, Ikeda (JP)

(73) Assignee: Cataler Corporation, Kakegawa-shi, Shizuoka (JP)

( * ) Notice: Subject to any disclaimer, the term of this patent is extended or adjusted under 35 U.S.C. 154(b) by 0 days.

(21) Appl. No.: 12/204,647

(22) Filed: Sep. 4, 2008

(65) Prior Publication Data
US 2009/0011932 A1    Jan. 8, 2009

Related U.S. Application Data

(63) Continuation of application No. PCT/JP2007/055099, filed on Mar. 14, 2007.

(30) Foreign Application Priority Data

Mar. 30, 2006  (JP) .................. 2006-095392

(51) Int. Cl.
*B01J 23/58* (2006.01)
(52) U.S. Cl. ..................................... 502/328
(58) Field of Classification Search .......... None
See application file for complete search history.

(56) References Cited

U.S. PATENT DOCUMENTS

| | | | |
|---|---|---|---|
| 3,904,553 A * | 9/1975 | Campbell et al. | 502/328 |
| 4,049,582 A * | 9/1977 | Erickson et al. | 502/306 |
| 4,440,874 A * | 4/1984 | Thompson | 502/327 |
| 6,150,288 A * | 11/2000 | Suzuki et al. | 501/105 |
| 7,498,288 B2 * | 3/2009 | Matsueda et al. | 502/325 |

FOREIGN PATENT DOCUMENTS

| | | |
|---|---|---|
| JP | 5-168926 | 7/1993 |
| JP | 6-75675 | 9/1994 |
| JP | 9-928 | 7/1997 |
| JP | 10-368 | 1/1998 |
| JP | 2000-169148 | 6/2000 |
| JP | 2000-189799 | 7/2000 |
| JP | 2001-129399 | 5/2001 |
| JP | 2003072262 | * 3/2003 |

OTHER PUBLICATIONS

Pakhomov et al, Physicochemical bases for the preperation of spinel supported bimetallic platinum catalyst for dehydrogenation of lower paraffins, Preperation of Catalysts VII, pp. 185-187.*
International Search Report, mailed May 29, 2007.
Kikuchi, Ryuji, Partial Oxidation of $CH_4$ and $C_3H_8$ over Hexaaluminate-type Oxidates, Applied Catalysis A; General 281, Issues 1-2 (2005) 61-67.

* cited by examiner

*Primary Examiner* — Melvin Mayes
*Assistant Examiner* — Stefanie Cohen
(74) *Attorney, Agent, or Firm* — Morrison & Foerster LLP

(57) ABSTRACT

An object of the present invention is to provide an exhaust gas-purifying catalyst that is less prone to cause a decrease in its activity even when used at high temperatures in an atmosphere whose oxygen concentration is high. An exhaust gas-purifying catalyst of the present invention includes a composite oxide of alkaline-earth metal and aluminum, and platinum, wherein at least a part of the composite oxide and at least a part of the platinum forms a solid solution.

11 Claims, 1 Drawing Sheet

Lean ⇔ Rich

Lean             Rich

EXHAUST GAS-PURIFYING CATALYST AND METHOD OF MANUFACTURING THE SAME

CROSS REFERENCE TO RELATED APPLICATIONS

This is a Continuation Application of PCT Application No. PCT/JP2007/055099, filed Mar. 14, 2007, which was published under PCT Article 21(2) in Japanese.

This application is based upon and claims the benefit of priority from prior Japanese Patent Application No. 2006-095392, filed Mar. 30, 2006, the entire contents of which are incorporated herein by reference.

BACKGROUND OF THE INVENTION

1. Field of the Invention

The present invention relates to an exhaust gas-purifying catalyst and method of manufacturing the same.

2. Description of the Related Art

As an exhaust gas-purifying catalyst that treats exhaust gas of an automobile, a three-way catalyst with precious metal such as platinum supported by an inorganic oxide such as ceria or alumina has been widely used. In the three-way catalyst, the precious metal plays the role in promoting the reduction of nitrogen oxides and the oxidations of carbon monoxide and hydrocarbons. Further, the inorganic oxide plays the roles in increasing the specific surface area of the precious metal and suppressing the sintering of the precious metal by dissipating heat generated by the reactions.

In recent years, occasions when the automotive vehicle such as automobile is driven at high-speed increase as the performance of an engine increases. Additionally, in order to prevent pollution of the air, the regulations on the exhaust gas are made more stringent. Against these backdrops, temperature of the exhaust gas emitted by the automotive vehicle is on the trend of rising.

Further, the automotive vehicle is required to decrease the carbon dioxide emission in order to suppress the global warming. For these reasons, occasions when the supply of fuel to the engine is cut off in the state that the exhaust gas-purifying catalyst is heated to high temperatures are increasing.

That is, the exhaust gas-purifying catalyst is used at temperatures higher than in the past, and occasions when exposed to an atmosphere excessive in oxygen at high temperatures are increasing. For that, in order to provide the exhaust gas-purifying catalyst that delivers a sufficient performance even when used under such a condition, research and development are actively carried out.

For example, JP-A 5-168926 (KOKAI), JP-B 6-75675 (KOUKOKU), and JP-A 2000-169148 (KOKAI) describe improving the heat stability of ceria. Specifically, JP-A 5-168926 (KOKAI) describes an exhaust gas-purifying catalyst containing an element of platinum group, activated alumina, cerium oxide, barium compound and zirconium compound. JP-B 6-75675 (KOUKOKU) describes an exhaust gas-purifying catalyst in which a catalyst-supporting layer contains cerium oxide, zirconium oxide and catalytic metal, and at least parts of cerium oxide and zirconium oxide are present as a composite oxide or a solid solution. JP-A 2000-169148 (KOKAI) describes a cerium-based composite oxide represented as the general formula: $Ce_{1-(a+b)}Zr_aY_bO_{2-b/2}$.

Further, JP-A 10-358 (KOKAI) and JP-A 2001-129399 (KOKAI) describe making platinum present as platinum composite oxide to suppress the sintering of platinum. Specifically, JP-A 10-358 (KOKAI) describes an exhaust gas-purifying catalyst using a high heat-resistant composite oxide that contains platinum and at least one element selected from alkaline-earth metal elements or group IIIA elements. JP-A 2001-129399 (KOKAI) describes an exhaust gas-purifying catalyst that includes a platinum composite oxide layer containing platinum and alkaline-earth metal element on an inorganic oxide support, in which a layer of oxide of metal X, which is at least one element selected from Mg, Ca, Sr, Ba, La and Ce, is interposed therebetween.

However, even if the heat-stability of ceria were improved, the sintering of platinum would occur when the exhaust gas-purifying catalysts are exposed to an atmosphere excessive in oxygen at high temperatures, for example, 1,000° C. to 1,200° C., and a sufficient activity would not be achieved. Also, in order to produce platinum composite oxide with a high heat-stability, firing at high temperature is necessary. For this reason, a large majority of exhaust gas-purifying catalysts using platinum composite oxide are small in specific surface area and insufficient in activity.

BRIEF SUMMARY OF THE INVENTION

An object of the present invention is to provide an exhaust gas-purifying catalyst that is less prone to cause a decrease in its activity even when used at high temperatures in an atmosphere whose oxygen concentration is high.

According to a first aspect of the present invention, there is provided an exhaust gas-purifying catalyst comprising a composite oxide of alkaline-earth metal and aluminum, and platinum, at least a part of the composite oxide and at least a part of the platinum forming a solid solution.

According to a second aspect of the present invention, there is provided a method of manufacturing an exhaust gas-purifying catalyst, comprising making oxide particles including only alkaline-earth metal as metal element support platinum, preparing a mixture of an aluminum compound and the oxide particles supporting platinum, and firing the mixture in an oxidizing atmosphere to obtain a solid solution including a composite oxide of alkaline-earth metal and aluminum and platinum.

DETAILED DESCRIPTION OF THE INVENTION

An embodiment of the present invention will be described below.

Figure 1:
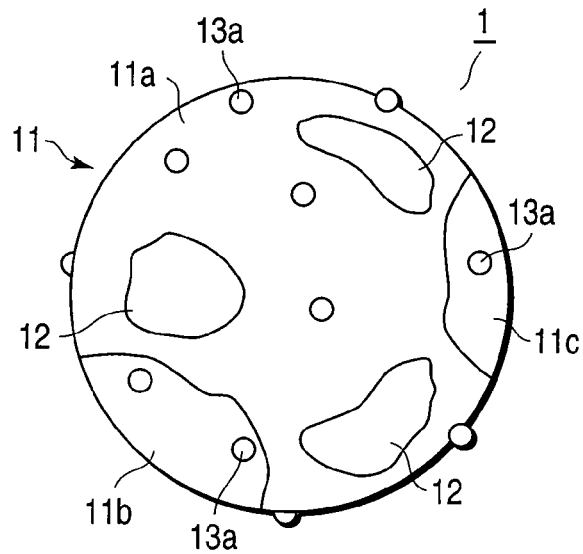
FIG. 1 is a view schematically showing an exhaust gas-purifying catalyst according to an embodiment of the present invention.

FIG. 1 is a view schematically showing an exhaust gas-purifying catalyst according to an embodiment of the present invention. The exhaust gas-purifying catalyst is a pellet catalyst prepared by agglomerating particles, one particle of which is shown in FIG. 1. The exhaust gas-purifying catalyst is used under high temperature conditions, for example, at 1,000° C. to 1,200° C.

The exhaust gas-purifying catalyst 1 shown in FIG. 1 includes a support 11 and platinum 13a supported thereby.

The support includes oxides 11a and 11b and a compound or composition 11b.

The oxide 11a is a composite oxide of alkaline-earth metal and aluminum. As the alkaline-earth metal, for example, magnesium and calcium can be used. The crystal structure of the oxide 11a is, for example, spinel structure.

The compound or composition 11b is an oxide including only alkaline-earth metal as metal element, a hydroxide including only alkaline-earth metal as metal element, a carbonate including only alkaline-earth metal as metal element, or a mixture including two or more of them. Typically, the compound or composition 11b is an oxide including only one element as metal element, a hydroxide including only one element as metal element, a carbonate including only one element as metal element, or a mixture of two or more of them including only one element as metal element. The alkaline-earth element included in the compound or composition 11b is the same as the alkaline-earth element included in the oxide 11a. The support 11 may not include the compound or composition 11b.

The oxide 11c is alumina. The support may not include the oxide 11c.

The above-described composite oxide and platinum form solid solution 12. Typically, only a part of the composite oxide forms the solid solution 12 with platinum. The solid solution 12 has a composition, for example, represented by a chemical formula: $(A,Pt)Al_2O_4$ or $A(Al,Pt)_2O_4$ in which the symbol "A" indicates alkaline-earth metal.

The exhaust gas-purifying catalyst 1 exhibits a reversible change in state when a composition of an atmosphere is changed under high temperature conditions. This will be described with reference to FIG. 2.

Figure 2:
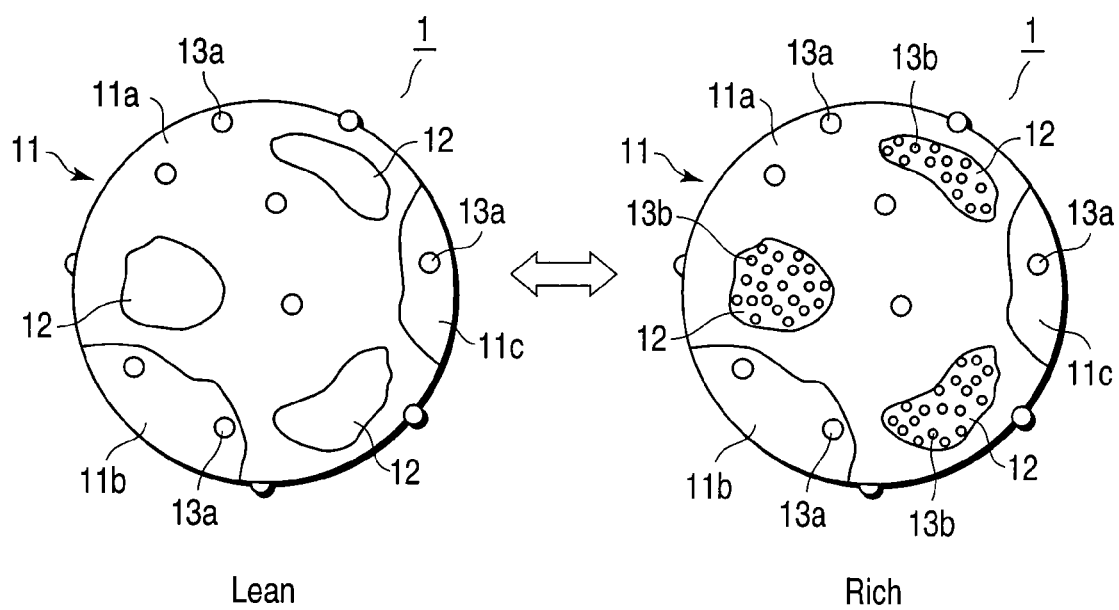
FIG. 2 is a conceptual view schematically showing a state change that the exhaust gas-purifying catalyst shown in FIG. 1 exhibits under high temperature conditions.

FIG. 2 is a view schematically showing a state change that the oxide particle contained in the material shown in FIG. 1 exhibits under high temperature conditions. In FIG. 2, the state indicated as "Lean" shows the state that the exhaust gas-purifying catalyst 1 exhibits when exposed to an atmosphere with a high oxygen concentration under high temperature conditions such as temperature conditions of 1,000° C. to 1,200° C., for example, when the fuel supply to an engine is cut off. The state indicated as "Rich" shows the state that the exhaust gas-purifying catalyst 1 exhibits when exposed to an atmosphere with a low oxygen concentration under high temperature conditions such as temperature conditions of 1,000° C. to 1,200° C., for example, when an abundance of fuel is continuously supplied to an engine.

The state indicated as "Lean" in FIG. 2 corresponds to the state described with reference to FIG. 1. Here, at least a part of the platinum 13a may be oxidized; in other words, its oxidation number may be increased.

In this state, the platinum 13a mainly contributes to the activity of the exhaust gas-purifying catalyst 1, while the platinum in the composite oxide 12 hardly contributes to the activity. However, during the period over which the exhaust gas-purifying catalyst 1 is in the state indicated as "Lean", a concentration of offensive components such as nitrogen oxides, carbon monoxide, hydrocarbons, and the like in the exhaust gas, that is, an offensive component concentration in an atmosphere is relatively low. Thus, the exhaust gas-purifying catalyst 1 delivers a sufficient performance.

When the oxygen concentration in the atmosphere is lowered under the high temperature conditions, the exhaust gas-purifying catalyst 1 causes a change from the state indicated as "Lean" to the state indicated as "Rich". Specifically, platinum is precipitated out of the solid solution 12, and the precipitated platinum forms the platinum 13b on the surface of the solid solution 12.

During the period over which the exhaust gas-purifying catalyst 1 is in the state indicated as "Rich", the offensive component concentration in the exhaust gas is relatively high. That is, during the period corresponding to the state indicated as "Rich", the exhaust gas purifying catalyst 1 is required to be higher in activity as compared to the period corresponding to the state indicated as "Lean".

The platinum 13b is much smaller in size than the platinum 13a. For example, the size of the platinum 13b is several nanometers or less, while the size of the platinum 13a is several tens of nanometers. Thus, the exhaust gas-purifying catalyst 1 in the state indicated as "Rich" is higher in activity than the exhaust gas-purifying catalyst 1 in the state indicated as "Lean". Therefore, the exhaust gas-purifying catalyst 1 delivers a sufficient performance even when the offensive component concentration in the exhaust gas is high.

The exhaust gas-purifying catalyst 1 in the state indicated as "Rich" causes a change to the state indicated as "Lean" when the oxygen concentration in the atmosphere increases under the high temperature conditions. That is, the platinum 13b and the composite oxides form the solid solution.

As described above, the exhaust gas-purifying catalyst 1 causes a reversible change in state. In addition, the exhaust gas-purifying catalyst 1 forms the ultrafine precious metals 13b on the surfaces of the solid solution 12 every time it causes the change from the state indicated as "Lean" to the state indicated as "Rich". Therefore, this state is recovered by the change from the state indicated as "Rich" to the state indicated as "Lean" and its reverse change. Since an automotive vehicle changes the oxygen concentration in the exhaust gas at relatively close intervals, the exhaust gas-purifying catalyst 1 always exhibits a high activity to deriver a sufficient performance when exposed to a low oxygen concentration atmosphere at high temperatures.

Also, in the exhaust gas-purifying catalyst 1, the platinum 13a contributes to the activity of the exhaust gas-purifying catalyst 1 regardless of the composition of the atmosphere and temperature. Therefore, the exhaust gas-purifying catalyst 1 delivers a sufficient performance not only when exposed to a high oxygen concentration atmosphere at high temperatures, but also when used for the first time or used under low temperature conditions.

Further, when the oxygen concentration in the atmosphere is increased under high temperature conditions, the exhaust gas-purifying catalyst 1 makes the platinum 13b and the composite oxide form the solid solution as described above. Thus, the exhaust gas-purifying catalyst 1 is low in the evaporation loss of precious metal in the high oxygen concentration atmosphere.

In the exhaust gas-purifying catalyst 1, an atomic ratio of aluminum with respect to alkaline-earth metal is set, for example, within a range of 1 to 12. When the atomic ratio is small or large, a proportion of the composite oxide in the support 11 is small. In other words, a proportion of the solid solution 12 in the exhaust gas-purifying catalyst 1 is small. Therefore, in this case, the sintering of platinum is prone to occur.

The precious metal content of the exhaust gas-purifying catalyst 1 is set, for example, within a range of 0.01% to 10% by weight, and typically within a range of 0.1% to 5% by weight. When the platinum content is small, a sufficient catalytic activity may not be achieved. When the platinum content is large, the sintering of platinum may be prone to occur.

The proportion of platinum forming a solid solution with respect to whole the platinum supported by the exhaust gas-purifying catalyst 1 (hereinafter referred to as a "solid solution-forming ratio") is set, for example, within a range of 10% to 80%. When the solid solution-forming ratio is small, the effect of suppressing the decrease in activity due to the sintering of platinum may be insufficient. When the solid solution-forming ratio is large, the initial activity may be insufficient.

The exhaust gas-purifying catalyst 1 can be manufactured, for example, by the following method.

First, powder of alkaline-earth metal oxide is prepared and made into slurry. Here, water is used as the dispersion medium, for example. Then, a solution of platinum salt is added to the slurry, and the resultant mixture is filtrated. Thereafter, drying and firing of the filter cake are carried out sequentially. The firing temperature is set, for example, within a range of 300° C. to 800° C., and typically at about 500° C. In this way, platinum is loaded onto the alkaline-earth metal oxide powder.

Next, the alkaline-earth metal oxide powder supporting platinum is mixed with an aluminum compound. For example, the alkaline-earth metal oxide powder supporting platinum is added to a liquid containing an aluminum compound. Then, the slurry is heated so as to sufficiently remove liquid. Thus, the aluminum compound is loaded onto the alkaline-earth metal oxide powder. Note that as the aluminum compound or the liquid containing the aluminum compound, for example, salts of aluminum and inorganic acid, salts of aluminum and organic acid, alumina sol, aluminum hydroxide and alumina can be used.

Then, the above-described oxide is fired in an oxidizing atmosphere. The firing temperature is set, for example, within a range of 600° C. to 1,100° C. The firing produces the composite oxide of the alkaline-earth metal and aluminum and further produces the solid solution of the composite oxide and platinum. Then, the powder obtained by the firing is subjected to compression molding, and the molded product is crushed when needed. Thus, the exhaust gas-purifying catalyst 1 in the form of pellet is obtained.

Meanwhile, a composite oxide of alkaline-earth metal and aluminum is less prone to produce a solid solution with platinum. For example, when platinum is loaded on the composite oxide of alkaline-earth metal and aluminum, and the resultant product is fired in an oxidizing atmosphere, they cannot form solid solution.

By contrast, according to the above-described method, platinum is loaded on the alkaline-earth metal oxide powder, then, the aluminum compound is further loaded thereto, and thereafter, the resultant product is fired in an oxidizing atmosphere. When such a process is employed, due to the strong interaction with the alkaline-earth metal oxide, platinum can be present as ion at or almost at the temperature over which the alkaline-earth metal and aluminum can form the composite oxide. Thus, according to the method, the composite oxide of alkaline-earth metal and aluminum can form solid solution with platinum.

Although in the above, an example is described in the case that the exhaust gas-purifying catalyst 1 is a pellet catalyst, the exhaust gas-purifying catalyst 1 can be made in various forms. For example, the exhaust gas-purifying catalyst 1 may be a monolith catalyst.

Example of the present invention will be described below.

EXAMPLE 1

50 g of magnesium oxide (MgO) powder with a specific surface area of 60 $m^2/g$ is weighed and added to 500 mL of deionized water. After well dispersing the MgO powder in the deionized water by 10 minutes of ultrasonic agitation, a solution of dinitrodiamine platinum nitrate was added to the slurry. The concentration and amount of the dinitrodiamine platinum nitrate solution were adjusted such that the platinum content in the exhaust gas-purifying catalyst as the final product would be 0.5% by weight.

After that, the slurry was filtrated under suction. The filtrate was subjected to inductively coupled plasma (ICP) spectrometry. As a result, it was revealed that the filter cake contained almost the entire platinum in the slurry.

Next, the filter cake was dried at 110° C. for 12 hours. Then, it was fired in the atmosphere at 500° C. for 1 hour. Thus, the MgO powder was loaded with platinum.

Subsequently, aluminum nitrate was dissolved into 1,600 mL of deionized water. Then, 50 g of the MgO powder supporting platinum was weighed and added into the aqueous solution of aluminum nitrate. Note that the concentration of the aqueous solution of aluminum nitrate was adjusted such that the atomic ratio of magnesium to aluminum would be 1:2.

Then, to the aqueous solution of aluminum nitrate, dropped was an aqueous ammonia solution prepared by dissolving 152 g ammonia ($NH_3$) into 500 mL of deionized water. After filtrating it under suction, the filter cake was dried at 110° C. Thus, the MgO powder supporting platinum was further loaded with an aluminum compound.

Then, the MgO powder supporting platinum and the aluminum compound was calcined in the atmosphere at 300° C. for 3 hours. The calcined product was crushed a mortar and fired in the atmosphere at 800° C. for 3 hours. This produced a composite oxide of magnesium and aluminum, and further produced the solid solution of the composite oxide and platinum.

A part of the powder thus obtained was drawn and subjected to X-ray diffraction analysis. As a result, it was revealed that the composite oxide had the chemical formula represented by $MgAl_2O_4$ and the crystal structure thereof was Spinel structure.

Further, another part of the powder thus obtained was drawn and immersed into an aqueous solution of hydrogen fluoride ($HF/H_2O=1/4$) at ambient temperature for 12 hours. Note that this condition is the one that of the powder, only the oxide as the support is dissolved. Subsequently, the solution was filtrated and the filtrate was subjected to the ICP spectrometry. As a result, the platinum content of the filtrate indicated that 74% of platinum formed solid solution, that is, the solid solution-forming ratio was 74%.

Next, the powder was subjected to compression molding. Further the molded product was crushed to obtain an exhaust gas-purifying catalyst in the form of pellet having a particle size of about 0.5 mm to about 1.0 mm. Hereinafter, the exhaust gas-purifying catalyst is referred to as "sample (1)".

EXAMPLE 2

Boehmite was dispersed in to 1,000 mL of deionized water. Subsequently, 50 g of the MgO powder, which was loaded with platinum by the same method as described for sample (1), was weighed and added to the dispersion. Note that the concentration of boehmite in the dispersion was adjusted such that atomic ratio of magnesium to aluminum would be 1:2. Thereafter, the dispersion was heated to remove water therefrom. Thus, the MgO powder supporting platinum was further loaded with an aluminum compound.

In this example, an exhaust gas-purifying catalyst was manufactured by the same method as described for sample (1) except that the MgO powder loaded with platinum and the aluminum compound by the above-described method was used. Hereinafter, the exhaust gas-purifying catalyst is referred to as "sample (2)".

Note that also in this example, the powder was subjected to an X-ray diffraction analysis as described for sample (1). As a result, it was revealed that the composite oxide had the chemical formula represented by $MgAl_2O_4$ and the crystal structure thereof was Spinel structure. Further the solid solution-forming ratio was determined by the same method as described for sample (1). As a result, it was revealed that the solid solution-forming ratio was 50%.

EXAMPLE 3

γ-alumina was dispersed into 1,000 mL of deionized water. Subsequently, 50 g of the MgO powder, which was loaded with platinum by the same method as described for sample (1), was weighed and added to the dispersion. Note that the concentration of alumina in the dispersion was adjusted such that atomic ratio of magnesium to aluminum would be 1:2. Thereafter, the dispersion was heated to remove water therefrom. Thus, the MgO powder supporting platinum was further loaded with an aluminum compound.

In this example, an exhaust gas-purifying catalyst was manufactured by the same method as described for sample (1) except that the MgO powder loaded with platinum and the aluminum compound by the above-described method was used. Hereinafter, the exhaust gas-purifying catalyst is referred to as "sample (3)".

Note that also in this example, the powder was subjected to an X-ray diffraction analysis as described for sample (1). As a result, it was revealed that the composite oxide had the chemical formula represented by $MgAl_2O_4$ and the crystal structure thereof was Spinel structure. Further the solid solution-forming ratio was determined by the same method as described for sample (1). As a result, it was revealed that the solid solution-forming ratio was 20%.

EXAMPLE 4

50 g of calcium oxide (CaO) powder with a specific surface area of 50 m$^2$/g is weighed and added to 500 mL of deionized water. After well dispersing the CaO powder in the deionized water by 10 minutes of ultrasonic agitation, a solution of dinitrodiamine platinum nitrate was added to the slurry. The concentration and amount of the dinitrodiamine platinum nitrate solution were adjusted such that the platinum content in the exhaust gas-purifying catalyst as the final product would be 0.5% by weight.

After that, the slurry was filtrated under suction. As a result of subjecting the filtrate to ICP spectrometry, it was revealed that the filter cake contained almost the entire platinum in the slurry.

Next, the filter cake was dried at 110° C. for 12 hours. Then, it was fired in the atmosphere at 500° C. for 1 hour. Thus, the CaO powder was loaded with platinum.

Subsequently, aluminum nitrate was dissolved into 1,600 mL of deionized water. Then, 50 g of the CaO powder supporting platinum was weighed and added into the aqueous solution of aluminum nitrate. Note that the concentration of the aqueous solution of aluminum nitrate was adjusted such that the atomic ratio of calcium to aluminum in the exhaust gas-purifying catalyst as the final product would be 1:2.

Then, to the aqueous solution of aluminum nitrate, dropped was an aqueous ammonia solution prepared by dissolving 109 g ammonia ($NH_3$) into 500 mL of deionized water. After filtrating it under suction, the filter cake was dried at 110° C. Thus, the CaO powder supporting platinum was further loaded with an aluminum compound.

Then, the CaO powder supporting platinum and the aluminum compound was calcined in the atmosphere at 300° C. for 3 hours. The calcined product was crushed using a mortar and fired in the atmosphere at 800° C. for 3 hours. This produced a composite oxide of calcium and aluminum, and further produced the solid solution of the composite oxide and platinum.

A part of the powder thus obtained was drawn and subjected to X-ray diffraction analysis. As a result, it was revealed that the composite oxide had the chemical formula represented by $CaAl_2O_4$ and the crystal structure thereof was Spinel structure.

Further, another part of the powder thus obtained was drawn, and the solid solution-forming ratio was determined by the same method as described for sample (1). As a result, it was revealed that the solid solution-forming ratio was 30%.

Next, the powder was subjected to compression molding. Further the molded product was crushed to obtain an exhaust gas-purifying catalyst in the form of pellet having a particle size of about 0.5 mm to about 1.0 mm. Hereinafter, the exhaust gas-purifying catalyst is referred to as "sample (4)".

Comparative Example 1

50 g of spinel ($MgAl_2O_4$) powder with a specific surface area of 80 m$^2$/g is weighed and added to 500 mL of deionized water. After well dispersing the $MgAl_2O_4$ powder in the deionized water by 10 minutes of ultrasonic agitation, a solution of dinitrodiamine platinum nitrate was added to the slurry. The concentration and amount of the dinitrodiamine platinum nitrate solution were adjusted such that the platinum content in the exhaust gas-purifying catalyst as the final product would be 0.5% by weight.

After that, the slurry was filtrated under suction. As a result of subjecting the filtrate to ICP spectrometry, it was revealed that the filter cake contained almost the entire platinum in the slurry.

Next, the filter cake was dried at 110° C. for 12 hours. Then, it was fired in the atmosphere at 500° C. for 1 hour. Thus, the $MgAl_2O_4$ powder was loaded with platinum.

Then, the $MgAl_2O_4$ powder supporting platinum was crushed using a mortar. Subsequently, it was fired in the atmosphere at 800° C. for 3 hours.

A part of the powder thus obtained was drawn, and the solid solution-forming ratio was determined by the same method as described for sample (1). As a result, it was revealed that platinum formed no solid solution, in other words, the solid solution-forming ratio was 0%.

Next, the powder was subjected to compression molding. Further the molded product was crushed to obtain an exhaust gas-purifying catalyst in the form of pellet having a particle size of about 0.5 mm to about 1.0 mm. Hereinafter, the exhaust gas-purifying catalyst is referred to as "sample (5)".

Comparative Example 2

50 g of alumina ($Al_2O_3$) powder with a specific surface area of 100 m$^2$/g is weighed and added to 500 mL of deionized water. After well dispersing the $Al_2O_3$ powder in the deionized water by 10 minutes of ultrasonic agitation, a solution of dinitrodiamine platinum nitrate was added to the slurry. The concentration and amount of the dinitrodiamine platinum nitrate solution were adjusted such that the platinum content in the exhaust gas-purifying catalyst as the final product would be 0.5% by weight.

After that, the slurry was filtrated under suction. As a result of subjecting the filtrate to ICP spectrometry, it was revealed that the filter cake contained almost the entire platinum in the slurry.

Next, the filter cake was dried at 110° C. for 12 hours. Then, it was fired in the atmosphere at 500° C. for 1 hour. Thus, the $Al_2O_3$ powder was loaded with platinum.

A part of the powder thus obtained was drawn, and the solid solution-forming ratio was determined by the same method as described for sample (1). As a result, the platinum content of the filtrate indicated that the solid solution-forming ratio was 0%.

Next, the powder was subjected to compression molding. Further the molded product was crushed to obtain an exhaust gas-purifying catalyst in the form of pellet having a particle size of about 0.5 mm to about 1.0 mm. Hereinafter, the exhaust gas-purifying catalyst is referred to as "sample (6)".

Next, the endurances of the samples (1) to (6) were tested by the following method.

First, each sample was set in a flow-type endurance test apparatus, and a gas containing nitrogen as a main component was made to flow through the catalyst bed at a flow rate of 100 mL/minute for 30 hours. The temperature of the catalyst bed was held at 1,050° C. As the gas made to flow through the catalyst bed, a lean gas prepared by adding oxygen to nitrogen at a concentration of 5% and a rich gas prepared by adding carbon monoxide to nitrogen at a concentration of 10% were used, and these gases were switched at intervals of 5 minutes.

Next, each sample was set in an atmospheric fixed bed flow reactor. Then, the temperature of the catalyst bed was raised from 100° to 500° C. at the temperature increase rate of 12° C./minute and its exhaust gas-purifying ratio was continuously measured while a model gas was made to flow through the catalyst bed. As the model gas, the gas containing equivalent amounts of oxidizing components (oxygen and nitrogen oxides) and reducing components (carbon monoxide, hydrocarbons and hydrogen), which were adjusted stoichiometrically, was used. The results are summarized in the table below.

TABLE 1

| Sample | Alkaline-earth metal source | Aluminum source | Pt content (Wt %) | Solid solution-forming ratio | 50% purifying temperature (° C.) HC | 50% purifying temperature (° C.) $NO_x$ |
|---|---|---|---|---|---|---|
| (1) | Magnesium oxide | Aluminum nitrate | 0.5 | 74 | 310 | 326 |
| (2) | Magnesium oxide | Boehmite | 0.5 | 50 | 318 | 335 |
| (3) | Magnesium oxide | γ-alumina | 0.5 | 20 | 330 | 360 |
| (4) | Calcium oxide | Aluminum nitrate | 0.5 | 30 | 326 | 353 |
| (5) | Spinel | | 0.5 | 0 | 355 | 430 |
| (6) | — | Alumina | 0.5 | 0 | 351 | 426 |

In the above table, the column denoted by "50% purifying temperature" shows the lowest temperature of the catalyst bed at which 50% or more of each component contained in the model gas was purified. The columns denoted by "HC" and "$NO_x$" show "50% purifying temperature" for hydrocarbons and nitrogen oxides, respectively.

As shown in the table, the samples (1) to (4) could purify the model gas at lower temperatures as compared with the samples (5) and (6). This result revealed that the samples (1) to (4) were excellent in endurance as compared with the samples (5) and (6).

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An exhaust gas-purifying catalyst comprising:
    a composite oxide consisting essentially of alkaline-earth metal, aluminum, and oxygen; and
    platinum, at least a part of the composite oxide and at least a part of the platinum forming a solid solution.

2. The exhaust gas-purifying catalyst according to claim 1, wherein only a part of the platinum forms the solid solution.

3. The exhaust gas-purifying catalyst according to claim 2, wherein the composite oxide is a composite oxide of magnesium and aluminum.

4. The exhaust gas-purifying catalyst according to claim 2, wherein a crystal structure of the composite oxide is spinel structure.

5. The exhaust gas-purifying catalyst according to claim 2, wherein the composite oxide is a composite oxide of magnesium and aluminum, and a crystal structure of the composite oxide is spinel structure.

6. The exhaust gas-purifying catalyst according to claim 1, wherein the composite oxide is a composite oxide of magnesium and aluminum.

7. The exhaust gas-purifying catalyst according to claim 1, wherein a crystal structure of the composite oxide is spinel structure.

8. The exhaust gas-purifying catalyst according to claim 1, wherein the composite oxide is a composite oxide of magnesium and aluminum, and a crystal structure of the composite oxide is spinel structure.

9. The exhaust gas-purifying catalyst according to claim 1, wherein the catalyst is a monolith catalyst.

10. The exhaust gas-purifying catalyst according to claim 1, wherein a proportion of platinum forming the solid solution with respect to entire platinum falls within a range of 10% to 80%.

11. A method of manufacturing an exhaust gas-purifying catalyst, comprising:
    making oxide particles including only alkaline-earth metal as metal element support platinum;
    preparing a mixture of an aluminum compound and the oxide particles supporting platinum; and
    firing the mixture in an oxidizing atmosphere to obtain a solid solution including a composite oxide and platinum, the composite oxide consisting essentially of alkaline-earth metal, aluminum and oxygen.

* * * * *